United States Patent
Mobarak et al.

(10) Patent No.: US 11,404,779 B2
(45) Date of Patent: Aug. 2, 2022

(54) ON-CHIP PHASED ARRAY CALIBRATION SYSTEMS AND METHODS

(71) Applicant: ANALOG DEVICES INTERNATIONAL UNLIMITED COMPANY, County Limerick (IE)

(72) Inventors: Mohamed Mobarak, Giza (EG); Ahmed Khalil, Dracut, MA (US)

(73) Assignee: Analog Devices International Unlimited Company, Limerick (IE)

( * ) Notice: Subject to any disclaimer, the term of this patent is extended or adjusted under 35 U.S.C. 154(b) by 375 days.

(21) Appl. No.: 16/748,030

(22) Filed: Jan. 21, 2020

(65) Prior Publication Data

US 2020/0295456 A1   Sep. 17, 2020

Related U.S. Application Data

(60) Provisional application No. 62/818,397, filed on Mar. 14, 2019.

(51) Int. Cl.
| | |
|---|---|
| *H01Q 3/26* | (2006.01) |
| *G01S 7/40* | (2006.01) |
| *H01Q 3/28* | (2006.01) |
| *H01Q 21/22* | (2006.01) |

(52) U.S. Cl.
CPC .......... *H01Q 3/267* (2013.01); *G01S 7/4004* (2013.01); *H01Q 3/28* (2013.01); *H01Q 21/22* (2013.01)

(58) Field of Classification Search
CPC .......... H01Q 3/267; H01Q 3/28; H01Q 21/22; G01S 7/4004
See application file for complete search history.

(56) References Cited

U.S. PATENT DOCUMENTS

| | | | |
|---|---|---|---|
| 4,864,315 A | 9/1989 | Mohuchy | |
| 5,235,342 A | 8/1993 | Orton | |
| 5,412,414 A | 5/1995 | Ast et al. | |
| (Continued) | | | |

FOREIGN PATENT DOCUMENTS

| | | |
|---|---|---|
| CN | 101479885 A | 7/2009 |
| CN | 101904051 A | 12/2010 |
| (Continued) | | |

OTHER PUBLICATIONS

Office Action dated Jun. 10, 2020 for Chinese Patent Application No. 201780051930.1, 8 pages and 9 page translation.
(Continued)

*Primary Examiner* — Vladimir Magloire
*Assistant Examiner* — Nazra Nur Waheed
(74) *Attorney, Agent, or Firm* — Knobbe, Martens, Olson & Bear, LLP

(57) ABSTRACT

Aspects of this disclosure relate to systems and methods for calibration of antenna arrays. The calibration may be based on determining a reference value for the beamformer derived from measurements of phase and/or amplitude for each channel within the beamformer. The measurements of phase and/or amplitude can be stored in non-volatile memory. Using a difference between the reference value and the measured values for each channel, a portion of a global configuration table may be copied to each channel's memory. Each channel can be separately calibrated based on the portion of the global configuration table copied to the local memory of each channel.

20 Claims, 6 Drawing Sheets

(56) References Cited

U.S. PATENT DOCUMENTS

| | | | |
|---|---|---|---|
| 5,581,517 A | 12/1996 | Gee et al. | |
| 5,657,023 A | 8/1997 | Lewis et al. | |
| 5,864,317 A | 1/1999 | Boe et al. | |
| 5,864,543 A | 1/1999 | Hoole | |
| 6,026,284 A * | 2/2000 | Seo | H03G 3/3042 455/115.1 |
| 6,104,935 A | 8/2000 | Smith | |
| 6,208,287 B1 | 3/2001 | Sikina et al. | |
| 6,252,542 B1 | 6/2001 | Sikina et al. | |
| 6,356,233 B1 | 3/2002 | Miller et al. | |
| 7,068,218 B2 | 6/2006 | Gotti et al. | |
| 7,362,266 B2 | 4/2008 | Collinson | |
| 7,471,237 B2 | 12/2008 | Wooldridge | |
| 7,576,686 B2 | 8/2009 | Needham et al. | |
| 7,714,776 B2 | 5/2010 | Cooper et al. | |
| 7,904,117 B2 | 3/2011 | Doan et al. | |
| 7,911,376 B2 | 3/2011 | Hardacker et al. | |
| 8,004,456 B2 | 8/2011 | Scott | |
| 8,045,926 B2 | 10/2011 | Martikkala et al. | |
| 8,199,048 B1 | 6/2012 | Medina Sanchez | |
| 8,295,788 B2 | 10/2012 | Rofougaran et al. | |
| 8,559,571 B2 | 10/2013 | Tung et al. | |
| 8,593,337 B2 | 11/2013 | Ookawa | |
| 8,976,845 B2 | 3/2015 | O'Keeffe et al. | |
| 9,035,828 B2 | 5/2015 | O'Keeffe et al. | |
| 9,113,346 B2 | 8/2015 | Pivit et al. | |
| 9,319,904 B1 | 4/2016 | Srinivasa et al. | |
| 9,331,751 B2 | 5/2016 | Sikina et al. | |
| 9,444,577 B1 | 9/2016 | Zhang et al. | |
| 9,628,256 B2 | 4/2017 | O'Keeffe et al. | |
| 9,692,530 B2 | 6/2017 | O'Keefee et al. | |
| 9,705,611 B1 | 7/2017 | West | |
| 9,762,283 B2 | 9/2017 | Chen et al. | |
| 9,876,514 B1 | 1/2018 | Corman et al. | |
| 9,912,467 B2 | 3/2018 | Alpert et al. | |
| 10,128,894 B1 | 11/2018 | O'Brien et al. | |
| 10,211,527 B2 | 2/2019 | Safavi-Naeini et al. | |
| 10,263,650 B2 | 4/2019 | Corman et al. | |
| 10,305,564 B1 | 5/2019 | Stang et al. | |
| 10,469,183 B1 | 11/2019 | Kuo | |
| 2001/0005685 A1 | 6/2001 | Nishimori et al. | |
| 2002/0089447 A1 | 7/2002 | Li | |
| 2002/0171583 A1 | 11/2002 | Purdy et al. | |
| 2004/0032365 A1 | 2/2004 | Gotti et al. | |
| 2004/0061644 A1 | 4/2004 | Lier et al. | |
| 2006/0234694 A1 | 10/2006 | Kawasaki | |
| 2006/0273959 A1 | 12/2006 | Kawasaki | |
| 2008/0129613 A1 | 6/2008 | Ermutlu et al. | |
| 2008/0225174 A1 | 9/2008 | Greggain et al. | |
| 2009/0267824 A1 | 10/2009 | Cooper et al. | |
| 2010/0117890 A1 | 5/2010 | Vook et al. | |
| 2012/0027066 A1 | 2/2012 | O'Keeffe | |
| 2012/0146840 A1 | 6/2012 | Ookawa | |
| 2013/0077708 A1 | 3/2013 | Sorrells et al. | |
| 2013/0120190 A1 | 5/2013 | McCune, Jr. | |
| 2013/0234883 A1 | 9/2013 | Ma et al. | |
| 2014/0111373 A1 | 4/2014 | Puzella et al. | |
| 2014/0169509 A1 | 6/2014 | Tsofe | |
| 2014/0210668 A1 | 7/2014 | Wang et al. | |
| 2015/0115978 A1 | 4/2015 | Bories | |
| 2015/0138026 A1 | 5/2015 | Shay | |
| 2015/0255868 A1 | 9/2015 | Haddad et al. | |
| 2016/0043465 A1 | 2/2016 | McDevitt et al. | |
| 2016/0191176 A1 | 6/2016 | O'Keeffe et al. | |
| 2016/0197660 A1 | 7/2016 | O'Keeffe et al. | |
| 2017/0117950 A1 | 4/2017 | Strong | |
| 2017/0234971 A1 | 8/2017 | Arai | |
| 2017/0310004 A1 | 10/2017 | Swirhun et al. | |
| 2017/0324486 A1 | 11/2017 | Garcia et al. | |
| 2018/0034565 A1 | 2/2018 | Tankielun | |
| 2018/0062260 A1 | 3/2018 | Khalil et al. | |
| 2018/0198537 A1 | 7/2018 | Rexberg et al. | |
| 2019/0058530 A1 | 2/2019 | Rainish et al. | |
| 2019/0149247 A1 | 5/2019 | Ananth | |
| 2019/0158194 A1 | 5/2019 | Wang | |
| 2019/0267707 A1 | 8/2019 | Khalil et al. | |
| 2020/0091608 A1 * | 3/2020 | Alpman | H01Q 25/001 |

FOREIGN PATENT DOCUMENTS

| | | | | |
|---|---|---|---|---|
| CN | 102347532 A | 2/2012 | | |
| EP | 2173010 | 4/2010 | | |
| EP | 2273614 | 1/2011 | | |
| EP | 2 285 102 A2 | 2/2011 | | |
| EP | 2285102 A2 * | 2/2011 | | H04N 19/20 |
| KR | 10-1564730 B1 | 10/2015 | | |
| WO | WO 2018/119153 A2 | 6/2018 | | |
| WO | WO 2018/166575 A1 | 9/2018 | | |

OTHER PUBLICATIONS

European Search Report dated Jul. 22, 2020 for European Patent Application No. 20160945.0. 7 pages.

International Search Report dated Nov. 7, 2017 for International Application No. PCT/EP2017/071427, 6 pages.

Written Opinion of the International Searching Authority dated Nov. 7, 2017 for International Application No. PCT/EP2017/071427, 10 pages.

Agrawal, et al., "A Calibration Technique for Active Phased Array Antennas," Johns Hopkins University Applied Physics Laboratory, 2003, in 8 pages.

Shipley, et al., "Mutual Coupling-Based Calibration of Phased Array Antennas," Technology Service Corporation, 2000, in 4 pages.

"Mutual coupling-based calibration of phased array antennas," Phased Array Systems and Technology, 2000, in 3 pages.

"A calibration technique for active phased array antennas," Phased Array Systems and Technology, 2003, in 3 pages.

Seker, "Calibration methods for phased array radars," Radar Systems Engineering Department, ASELSAN, Ankara, Turkey, 2016, in 16 pages.

Kanemaru, et al., "79 GHz CMOS Circuits for Phase/Amplitude Calibration in High-resolution Beamforming Radar Systems", Proceedings of the 43$^{rd}$ European Microwave Conference, pp. 1615-1618, 2013.

Sato, et al., "Millimeter wave CMOS integrated circuit for multi-gigabit communication and radar applications", Radio-Frequency Integration Technology (RFIT) 2015 IEEE International Symposium on, pp. 49-51, 2015.

Jing, et al., "Self-Calibration for the Multiple Channel Phase Array System Based on Near-Field Weighting," Key Laboratory of Electronics and Information Technology in Satellite Navigation (Beijing Institute of Technology, 100081) Ministry of Education, Beijing, China, Radar Conference 2015, IET International, 6 pages.

Kumar, M., et al., "Broad-Band Active Phase Shifter Using Dual-Gate MESFET", IEEE Transactions on Microwave Theory and Techniques, vol. MTT-29, No. 10, Oct. 1981, pp. 1098-1102.

Valdes-Garcia et al., "A Fully Integrated 16-Element Phased-Array Transmitter in SiGe BiCMOS for 60-GHz Communications," IEEE Journal of Solid-State Circuits (Dec. 12, 2010) vol. 45, No. 12, pp. 2757-2773.

* cited by examiner

ON-CHIP PHASED ARRAY CALIBRATION SYSTEMS AND METHODS

INCORPORATION BY REFERENCE

The present application is related to U.S. patent application Ser. No. 15/904,045, filed Feb. 23, 2018 and titled "ANTENNA ARRAY CALIBRATION SYSTEMS AND METHODS," and U.S. patent application Ser. No. 16/178,303, filed Nov. 1, 2018 and titled "LOW-LOSS VECTOR MODULATOR BASED PHASE SHIFTER," the disclosures of which are each hereby incorporated by reference in their entirety herein. Further, the present application claims priority to U.S. Provisional Patent Application No. 62/818,397, titled "ON-CHIP PHASED ARRAY CALIBRATION SYSTEMS AND METHODS," the disclosure of which is hereby incorporated by reference herein in its entirety. Any and all applications, if any, for which a foreign or domestic priority claim is identified in the Application Data Sheet of the present application are hereby incorporated by reference in their entireties under 37 CFR 1.57.

FIELD OF THE DISCLOSURE

The present disclosure relates to an antenna array, in particular to calibration of the antenna array.

BACKGROUND

An antenna with a single antenna element will typically broadcast a radiation pattern that radiates equally in all directions in a spherical wavefront. Phased antenna arrays generally refer to a collection of antenna elements that may be used to focus electromagnetic energy in a particular direction creating a main beam. Phased antenna arrays are being used more frequently in a myriad of different applications, such as in military applications, mobile technology, on airplane radar technology, automotive radars, cellular telephone and data, and Wi-Fi technology.

The individual antenna elements of a phased-antenna array may radiate in a spherical pattern, but collectively generate a wavefront in a particular direction through constructive and destructive interference. The relative phases of the signal transmitted at each antenna element can be either fixed or adjusted, allowing the antenna system to steer the wavefront in different directions. A phased-antenna array typically includes an oscillator, a plurality of antenna elements, a phase adjuster or shifter, a variable gain amplifier, a receiver, and a control processor. A phased antenna array system uses phase adjusters or shifters to control the phase of the signal transmitted by an antenna element. The radiated patterns of the antenna elements constructively interfere in a particular direction creating a wavefront in that direction, which may sometimes be referred to as the main beam. The phased array can realize increased gain and improved signal to noise ratio in the direction of the main beam. The radiation pattern may destructively interfere in one or more additional directions other than the direction of the main beam, and can reduce gain in those directions.

The amplitude of the signals emanating from the antenna elements affects the side lobe levels, where the side lobes are lobes of the radiation pattern that are not in the direction of the main lobe. It is generally preferable to reduce side lobe levels such that the antenna system can focus transmission in a particular desired direction. As such, the precision of the relative phase and amplitude for the elements determine the precision of the beam direction and the side lobe levels, respectively. Thus, the accuracy of the control of the phase shift and amplitude for the collection of antenna elements is important to the implementation of the phased array.

SUMMARY OF THE DISCLOSURE

The innovations described in the claims each have several aspects, no single one of which is solely responsible for the desirable attributes. Without limiting the scope of the claims, some prominent features of this disclosure will now be briefly described.

Some aspects include a controller configured to calibrate a beamforming integrated circuit, the controller comprising: a non-volatile memory configured to store measured gain data for a plurality of channels of a beamforming integrated circuit; and calibration circuitry configured to: determine a reference gain value based at least in part on the measured gain data for the plurality of channels stored at the non-volatile memory; and for each channel of the plurality of channels: determine a difference between a maximum gain value of the channel obtain from the non-volatile memory and the reference gain value; and copy a portion of a variable gain amplifier configuration attenuation table stored in a shared memory of the beamforming integrated circuit to a channel memory associated with the channel, wherein the variable gain amplifier configuration attenuation table comprises configuration settings for variable gain amplifiers of the beamforming integrated circuit, and wherein the portion of the variable gain amplifier configuration attenuation table copied from the shared memory starts at an address corresponding to the difference between the maximum gain value of the channel and the reference gain value.

In some aspects, at least one channel supports a different maximum gain value than at least one other channel of the plurality of channels.

In some aspects, each channel of the plurality of channels supports a maximum gain value.

In some aspects, at least one channel of the plurality of channels supports a different maximum gain value.

In some aspects, the reference gain value comprises a lowest common value among a set of maximum gain values supported by the plurality of channels, wherein the set of maximum gain values comprises maximum gain values supported by at least one of the plurality of channels.

In some aspects, the non-volatile memory is further configured to store measured phase data for the plurality of channels, wherein the calibration circuitry is further configured to: determine a reference phase value based at least in part on the measured phase data for the plurality of channels stored at the non-volatile memory; and for each channel of the plurality of channels: determine a difference between a phase value of the channel obtain from the non-volatile memory and the reference phase value; and copy a portion of a phase shifter configuration table stored in the shared memory of the beamforming integrated circuit to the channel memory associated with the channel, wherein the phase shifter configuration table comprises configuration settings for phase shifters of the beamforming integrated circuit, and wherein the portion of the phase shifter configuration table copied from the shared memory starts at an address corresponding to the difference between the phase value of the channel and the reference phase value.

In some aspects, the reference gain value is stored in volatile memory.

In some aspects, the shared memory is a volatile memory.

In some aspects, the channel memory corresponding to each of the plurality of channels is a volatile memory.

Some aspects include a method for calibrating a beamforming integrated circuit, the method comprising: storing, in a non-volatile memory, measured gain data for a plurality of channels of a beamforming integrated circuit; and determining, by calibration circuitry, a reference gain value based at least in part on the measured gain data for the plurality of channels stored at the non-volatile memory; and for each channel of the plurality of channels: determining a difference between a maximum gain value of the channel obtain from the non-volatile memory and the reference gain value; and copying a portion of a variable gain amplifier configuration attenuation table stored in a shared memory of the beamforming integrated circuit to a channel memory associated with the channel, wherein the variable gain amplifier configuration attenuation table comprises configuration settings for variable gain amplifiers of the beamforming integrated circuit, and wherein the portion of the variable gain amplifier configuration attenuation table copied from the shared memory starts at an address corresponding to the difference between the maximum gain value of the channel and the reference gain value.

In some aspects, at least one channel supports a different maximum gain value than at least one other channel of the plurality of channels.

In some aspects, each channel of the plurality of channels supports a maximum gain value.

In some aspects, at least one channel of the plurality of channels supports a different maximum gain value.

In some aspects, the reference gain value comprises a lowest common value among a set of maximum gain values supported by the plurality of channels, wherein the set of maximum gain values comprises maximum gain values supported by at least one of the plurality of channels.

In some aspects, the method further comprises: storing, in the non-volatile memory, measured phase data for the plurality of channels; determining a reference phase value based at least in part on the measured phase data for the plurality of channels stored at the non-volatile memory; and for each channel of the plurality of channels: determining a difference between a phase value of the channel obtain from the non-volatile memory and the reference phase value; and copying a portion of a phase shifter configuration table stored in the shared memory of the beamforming integrated circuit to the channel memory associated with the channel, wherein the phase shifter configuration table comprises configuration settings for phase shifters of the beamforming integrated circuit, and wherein the portion of the phase shifter configuration table copied from the shared memory starts at an address corresponding to the difference between the phase value of the channel and the reference phase value.

In some aspects, the reference gain value is stored in volatile memory.

In some aspects, the shared memory is a volatile memory.

In some aspects, the channel memory corresponding to each of the plurality of channels is a volatile memory.

Some aspects include a controller configured to calibrate a beamforming integrated circuit, the controller comprising: calibration circuitry configured to: determine a reference gain value based at least in part on measured gain data for the plurality of channels stored at a non-volatile memory; and for each channel of the plurality of channels: copy a portion of a variable gain amplifier configuration attenuation table stored in a shared memory of the beamforming integrated circuit to a channel memory associated with the channel, wherein the variable gain amplifier configuration attenuation table comprises configuration settings for variable gain amplifiers of the beamforming integrated circuit, and wherein the portion of the variable gain amplifier configuration attenuation table copied from the shared memory starts at an address corresponding to a difference between a maximum gain value of the channel obtain from the non-volatile memory and the reference gain value.

In some aspects, the reference gain value is stored in volatile memory.

For the purposes of summarizing the disclosure, certain aspects, advantages and novel features of the innovations have been described herein. It is to be understood that not necessarily all such advantages may be achieved in accordance with any particular aspect. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

These drawings and the associated description herein are provided to illustrate specific aspects and are not intended to be limiting.

DETAILED DESCRIPTION

Figure 1:
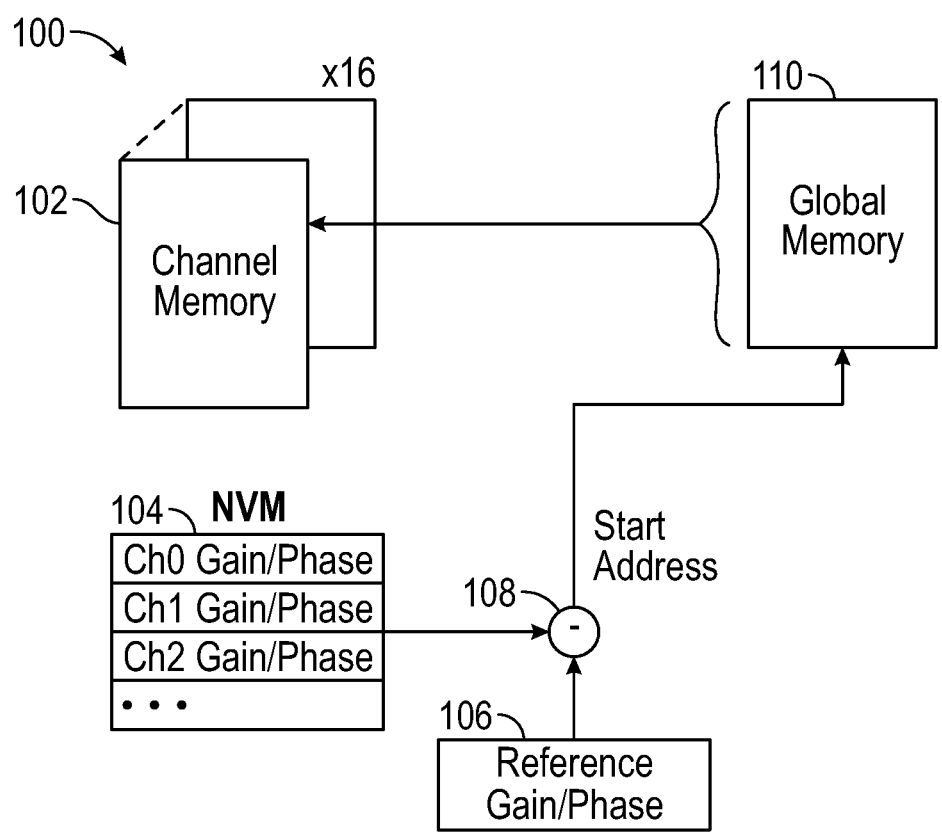
FIG. 1 illustrates an example memory architecture for a beamforming chip according to certain aspects.

The following detailed description of certain aspects presents various descriptions of specific aspects. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain aspects can include more elements than illustrated in a drawing and/or a subset of the elements illustrated in a drawing. Further, some aspects can incorporate any suitable combination of features from two or more drawings. The headings provided herein are for convenience only and do not necessarily affect the meaning or scope of the claims.

Beamforming Chip Memory Architecture

An antenna array can enable a beamformer to steer or focus an electromagnetic radiation pattern in a particular direction. The beamformer may generate a main beam in a particular direction and may generate side lobes in other directions. The main beam of the radiation pattern may be generated based on constructive inference of a plurality of signals output by an antenna array. The plurality of signals may be aligned by modifying the phases of at least some of the transmitted signal. Furthermore, the side-lobe levels may be controlled by adjusting the phases and amplitudes of the signals output by the antenna elements. A beamformer can generate a desired antenna pattern by, for example, configuring one or more phase shifter settings and/or one or more variable gain amplifiers to modify the phase and amplitude of signals output by the antenna elements of the beamformer antenna array. Differences in the channels due, for example, to imperfections in the materials or inconsistencies in the manufacturing process may cause inconsistencies in the output of signals from different antennas of the antenna array. Thus the resultant phase and/or output signal strength of the main lobe and side lobes may not match desired specifications. Further, over time, degradation may occur in the channels. To address the inaccuracies innate in the manufacturing process, calibration is often performed in an attempt to align the channels. To perform the calibration, it is desirable to accurately measure and control the phase and amplitude of antenna elements in an array system. The calibration process can be labor intensive, time consuming, and costly. Thus, there is a need for a method of calibration that can be performed without expensive test equipment and facilities. Systems and methods disclosed herein may be applicable during the manufacturing test process and can be used to speed up production and lower costs. However, techniques disclosed herein may also be applied subsequent to manufacture, such as during incorporation into a device by a third-party or during use of the beamformer. In some aspects, the calibration data may be used by the beamformer in combination with other data, such as pre-calculated or pre-stored antenna pattern data, to generate appropriate or desired settings for particular beamforming implementations or use-cases.

Traditional calibration techniques may use additional circuitry within the antenna array system to capture measurement data, which may be used during calibration. However, such implementations typically require changes to the PCB board to incorporate additional antenna elements and components for calibration of the signal paths, which may cause complications in certain use cases, such as when used with radar systems.

The maximum supported gain and/or the gain range may vary across different channels of the antenna array. Further, the phase for each channel may also differ for different channels of the antenna array. In other words, when the beamformer is configured to transmit at 0 degrees, two channels may communicate at two slightly different angles due to differences between the channels. The variance in the gain and/or phase of the different channels may occur due, for example, to variance in fabrication, which may be due to differences or imperfections in manufacturing conditions, manufacturing process, or materials.

The present disclosure provides systems and methods for calibration of antenna arrays. These antenna arrays may be used in a variety of technologies, such as fifth generation cellular technology (5G), radar, or any other application of phased antenna arrays. The present disclosure enables an antenna array system to perform calibration using raw measurements of phase and/or amplitude data. The raw measurements of phase and/or amplitude can be stored in a non-volatile memory. Thus, calibration can be performed, and the performance variance between components on different channels of a transceiver, receiver, or a transmitter can be accounted for during operation of the beamformer based on raw measurements of signals transmitted using the beamformer. In some aspects, the raw measurements of gain and/or phase of a channel in the beamformer can be measured by equipment external to the antenna array system and stored in a memory of the beamformer, such as a non-volatile memory, disposed within the antenna array system. Advantageously, in certain implementations, the antenna array system of the present disclosure does not require substantial hardware modifications for calibration. The antenna array system can store the raw measurements of each channel of the antenna array in a non-volatile memory for persistent storage, and the measurements may be retrieved and used for calibration as needed or desired.

In some aspects, systems and methods of the present disclosure include storing measurements of a maximum supported gain and/or a deviation from a reference phase for channels of a beamforming chip that can be used to control a beamforming chip. The beamforming chips may include aspects of beamforming chips described in U.S. patent application Ser. No. 15/904,045, filed Feb. 23, 2018, titled "ANTENNA ARRAY CALIBRATION SYSTEMS AND METHODS," and U.S. patent application Ser. No. 16/178, 303, filed Nov. 1, 2018, titled "LOW-LOSS VECTOR MODULATOR BASED PHASE SHIFTER," both of which are previously incorporated by reference as stated above. For example, the beamforming chip may include or be incorporated as part of the phase array antenna system 10, the receiver 1006 or the transmitter 1008 of U.S. patent application Ser. No. 16/178,303. The measurements may be stored in a non-volatile memory, and a controller can use the data to calibrate the channels of the beamforming chip. FIG. 1 illustrates an example memory architecture 100 for the beamforming chip according to certain aspects.

In some aspects, the phase and gain measurements of each of the channels of the beamforming chip can be stored in non-volatile memory (NVM) 104. The beamforming chip can identify a reference gain and/or phase 106. The reference gain and/or phase 106 can be used to determine a relative variance across the channels of the measured gain and/or phase stored in the non-volatile memory 104. The reference gain and reference phase may be stored within the non-volatile memory 104. Alternatively, the reference gain and/or phase 106 can be stored in volatile or static memory, such as RAM memory. In some aspects, the reference gain and reference phase may be stored within a bypass register or SRAM register of the non-volatile memory. Thus, in certain aspects, the reference gain and reference phase may be stored within a volatile portion of a non-volatile memory system.

In some aspects, the reference gain and/or phase 106 can be subtracted via a subtractor 108 from the corresponding measurements of gain and/or phase for each of the channels of the beamforming chip can be stored in non-volatile memory 104. The subtractor 108 may include or be a substractor. Alternatively, in certain aspects, the subtractor 108 may include or be replaced by alternative digital logic structures for subtracting the reference gain and/or phase 106 from measurement of gain and/or phase for each of the channels of the beamforming chip. For example, the subtractor 108 may include or be replaced with any type of logic that may be generated by a logic design tool, such as an automatic logic generator. In some aspects, the reference gain can include a gain measurement of a channel, or be derived from a gain measurement of a channel.

In some aspects, the reference gain and/or phase 106 can be based on the measurements of gain and/or phase for one or more of the channels of the beamforming chip, and can be stored in non-volatile memory 104. In the example of FIG. 1, the antenna array can include 16 channels, each corresponding to a maximum gain value for the corresponding channel. The reference gain can include a lowest common maximum gain value for the channels of the beamforming chip system. The reference gain value can be subtracted from the corresponding actual measurements of gain and/or phase for each of the channels of the antenna array and can be stored in non-volatile memory 104. For example for a 2 channel antenna array, if channel 0 has a maximum gain of 20 dB and channel 1 has a maximum gain of 22 dB, the reference gain may be designated as 20 dB as it is the lower maximum among the two channels. It may be desirable to identify the maximum gain that is commonly supported among a set of channels in order to limit a gain of the beamforming chip to a value that can be supported by all channels within the beamformer. For instance, in the previous example it may be undesirable to select a gain of 21 dB because although channel 1 may support such a gain value, channel 0 may not. The measurements of maximum gain supported by the channels of the beamforming chip may be obtained during a manufacturing and/or testing process performed with respect to the beamforming chip. It should be understood that each beamforming chip may have different measured maximum gain values due to, for example, variations that may occur during the manufacturing process.

In some aspects, the reference phase may be selected as an arbitrary angle, for example 0 degrees, 45 degrees, 90 degrees, etc. that can be used to align each of the channels during a calibration process. For example, if the reference phase is specified to be 0 degrees, a measurement of the phase of an output signal may be obtained when the input phase of the signal is 0 degrees. For instance, when the channel is set to the desired reference phase of 0 degrees, it may be determined through measurement of the output signal that due, for example, to process variations that the output signal is at 1 degree or 5 degrees. This measurement of phase for each channel may be stored in the NVM 104. When attempting to calibrate the beamforming chip, the measured phase may be subtracted from the selected reference phase (or vice versa) of 0 degrees to obtain an index value for indexing a portion of a phase calibration table stored in a global memory 110. This global memory 110 may be shared among channels of the beamforming chip, or in some cases, among multiple beamforming chips. In some aspects, the reference phase can include a phase measurement of a channel, or be derived from a phase measurement of a channel.

In some aspects, the global memory 110 can be used to retrieve calibration data for each of the channels. The global memory 110 can be a volatile or static memory. The global memory 110 can be used to retrieve gain and/or phase values for each of the channel memory 102. The global memory 110 can store a variable gain amplifier configuration table, where the variable gain amplifier configuration table stores configuration settings for variable gain amplifiers of a beamforming integrated circuit. The configuration settings can include an attenuation value for the variable gain amplifier for reducing gain from a maximum supported gain to a desired gain. For instance, with reference to FIG. 2, if the desired gain is the common maximum supported gain, then the attenuation value stored at an address associated with the common maximum supported gain (in this case address 0) may be applied to a set of variable gain amplifiers associated with the beamformer channels. In the illustrated example of FIG. 2, the maximum supported gain of channel 0 and of the beamformer are the same. Thus, the attenuation value stored at address 0 of the memory associated with channel 0 is 0 dB. However, the maximum supported gain of channel 1 is 2 dB greater than the common maximum supported gain of the beamformer. Thus, the attenuation value stored at address 0 of the memory associated with channel 1 is 2 dB.

The global memory 110 can store a phase shifter configuration table, where the phase shifter configuration table stores configuration settings for phase shifters of a beamforming integrated circuit. The configuration settings can include a phase degree for shifting the phase of a signal.

Figure 2:
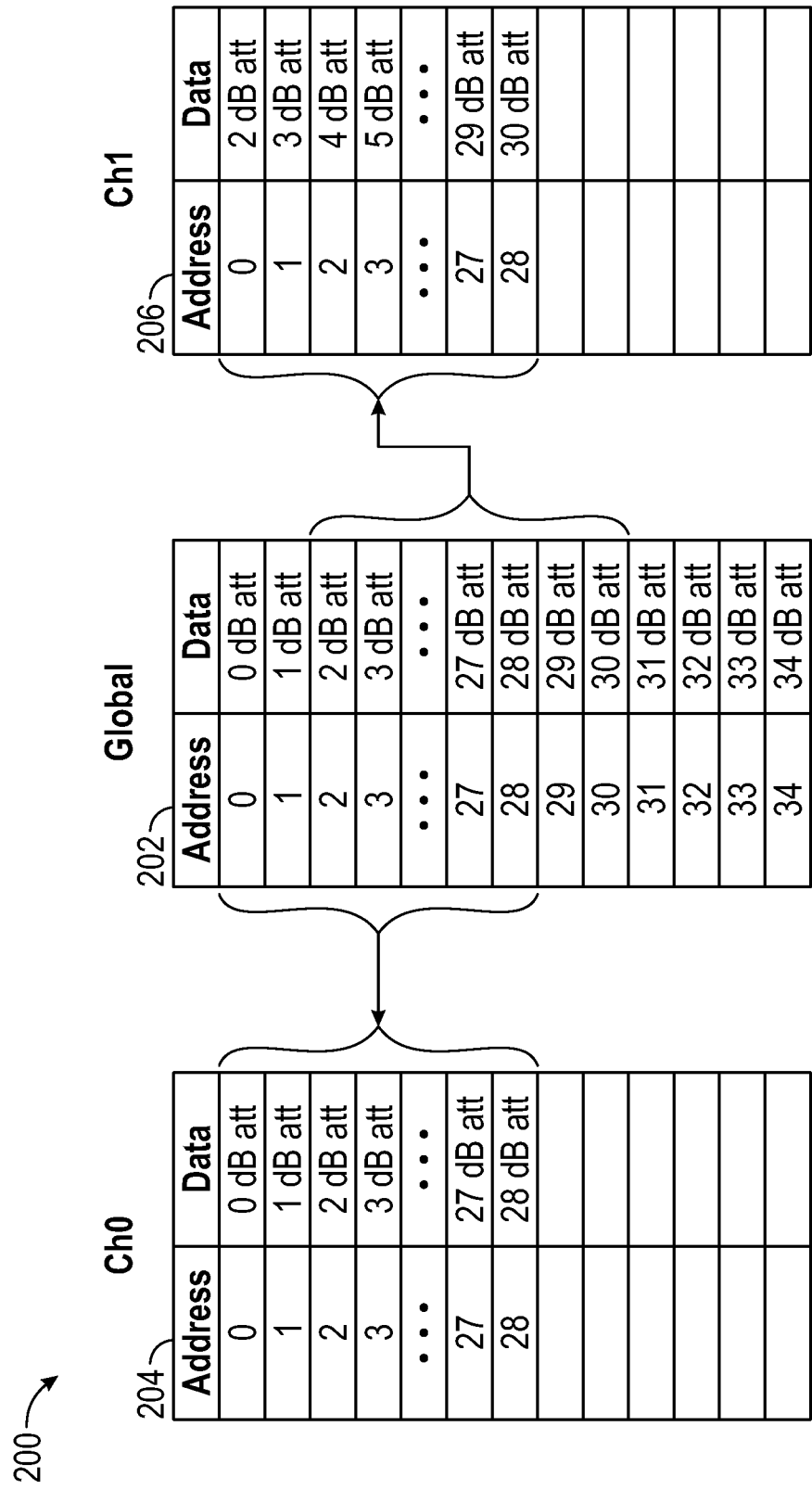
FIG. 2 illustrates an example of the use of a variable gain amplifier configuration table for configuration of variable gain amplifiers for each of the channels of a beamforming chip according to certain aspects.

In some aspects, a portion of the global memory 110 can be copied to corresponding channels of the channel memory 102 as illustrated in FIG. 2. The portion of the global memory 110 copied to the channel memory 102 may differ for each channel of the beamforming chip based, at least in part, on a difference between the supported gain of the channel and the reference gain, and/or the difference between a measured phase of the channel and a reference phase when the channel is set at the reference phase. The portion of the global memory 110 copied to the channel memory may be associated with the supported gain range of the beamforming chip. Further, the portion of the global memory 110 copied to the channel memory 102 may differ for each channel based at least in part on a difference between the reference gain and the maximum supported gain of the channel. Thus, for example, while each channel may receive the same number of entries from the global memory 110, such as 20, 22, or 25 entries, the entries received may differ for at least some of the channels based on the maximum supported gain of the channel and the reference gain. The portion copied from the variable gain amplifier configuration table of the global memory can start at a start address corresponding to the difference between the maximum gain of the corresponding channel and the reference gain value 106 and may continue for a number of entries associated with the gain range for the beamforming chip. In some aspects, the start address can be derived based on the difference between the maximum gain of the corresponding channel and the reference gain value 106.

Similarly in some respects to the gain amplifier configuration table, a portion of the phase shifter configuration table may be copied from the global memory beginning at a start address corresponding to the difference between the phase offset of the corresponding channel and the reference phase value 106. However, in certain aspects, unlike the gain amplifier configuration table, because a particular channel may support a full 360 degrees, the entire table may be copied with the value associated with the first entry in the calibration table copied to channel memory being selected from the global memory based at least in part on the difference between the reference phase and the measured phase when the channel is configured with the reference phase. In other words, in some cases an entry at address 0 may serve as a start address for a first channel while an entry at address 1 may server as a start address for a second channel with the entry at address 0 being the last entry copied to the channel memory. Another example of the copying of the phase table is illustrated with respect to FIG. 3.

In the example of FIG. 1, the antenna array includes 16 channels. In other aspects, the antenna array can include more or less channels. The channels can include circuitry to adjust the gain of a signal traveling through the corresponding channel. The channels can include circuitry to adjust the phase of a signal traveling through the corresponding channel. For example, one or more channels can include a variable gain amplifier and/or a phase shifter for adjusting the gain and/or phase, respectively, of the corresponding channel.

In some aspects, the beamforming chip can include a channel memory 102 for each of the channels. The channel memory 102 can include gain setting data for the circuitry to adjust the gain, such as a variable gain amplifier. The gain setting data can be used to control the adjustment of gain within the variable gain amplifier. For example, the gain setting data can include a certain amount of signal attenuation for the variable gain amplifier. In some aspects, the channel memory 102 can include phase setting data for the circuitry to adjust the phase, such as a phase shifter. The phase setting data can be used to control the adjustment of phase within the phase shifter. The phase setting data can include a certain amount of phase offset for the phase shifter. For example, assume the maximum gain for channel 0 is 20 dB and for channel 1 is 22 dB. If, in this example, the desired gain is 18 dB, then a particular address (e.g., address 2) of the channel memory for each channel may be selected. For channel 0, address 2 may indicate an attenuation of 2 dB to reduce the 20 dB gain to 18 dB. However, for channel 1, the address 2 may indicate an attenuation of 4 dB to reduce the 22 dB gain to 18 dB. Thus, despite different supported maximum gains, both channels can be attenuated to the same gain value when accessing the same address in the corresponding channel memory 102 for the channel.

In some aspects, the channel memory 102 can adjust for variances between channels, such as variances in components, signal mismatches, signal degradation, and/or the like. The channel memory 102 can be a volatile or static memory.

Example Variable Gain Amplifier Configuration Table

FIG. 2 illustrates an example 200 of the use of a variable gain amplifier configuration table for configuration of variable gain amplifiers for each of the channels of the beamforming chip according to certain aspects.

In the example of FIG. 2, maximum gain across channels of a beamforming chip may vary. For instance the gain across channels may vary from 20 to 26 dB. In one non-limiting example, the gain range may be 34 dB and the VGAs may be capable of adjusting gain in 1 dB steps. In this example, 6 dB of the gain range may be reserved for calibration. So after calibration, the gain range may be 28 dB.

In some aspects, channel 0 (ch0) has a maximum gain of 20 dB, and channel 1 (ch1) has a maximum gain of 22 dB. The other channels of the beamforming chip have maximum gains higher than 20 dB. The reference gain can be identified as 20 dB, as the lowest maximum gain across all channels. In some aspects, the reference gain can be a desired gain, such as a minimum gain to receive and/or transmit a certain target or signal.

In some aspects, the reference gain can be subtracted from the maximum gain of the channel. For channel 0 (ch0), the reference gain of 20 dB can be subtracted from the maximum gain of 20 dB. Accordingly, the portion of the gain configuration table 202 stored in the global memory can be copied to the channel 0 (ch0) memory 204, starting from the address that corresponds to the 0 dB attenuation. Because the gain range is 28 dB, the copied portion can start at the address corresponding to 0 dB attenuation (address 0 in the global memory 202) and go up to 28 dB (address 28 in the global memory 202), the gain range. The portion copied into the channel 0 memory 204 can be copied such that the address corresponding to the 0 dB attenuation is the starting address (address 0) in the channel 0 memory 204, and the address corresponding to the 28 dB attenuation is the last address (address 28) in the channel 0 memory 204. Likewise, the channel 1 (ch1) memory 206 can be populated based on a maximum gain of 22 dB.

In some aspects, for channel 1 (ch1), the reference gain of 20 dB can be subtracted from the maximum gain of 22 dB. Accordingly, another portion of the gain configuration table 202 stored in the global memory can be copied to the channel 1 (ch1) memory 206, starting from the address that corresponds to the 2 dB attenuation, which was the difference between the reference gain of 20 dB and the maximum gain of 22 dB for channel 1. Because the gain range is 28 dB, the copied portion can start at the starting address corresponding to 2 dB attenuation (address 2 in the global memory 202) and can end at an end address of 30 dB (address 30 in the global memory 202), the range of the gain supported by channel 1. The portion copied into the channel 1 memory 206 can be copied such that the address corresponding to the 2 dB attenuation is the starting address (address 0) in the channel 1 memory 206, and the address corresponding to the 30 dB attenuation is the last address (address 28) in the channel 1 memory 206. Advantageously, even if the supported gain across different channels varies, the channel gain for each channel can be adjusted to account for these variations.

Example Phase Shifter Configuration Table

Figure 3:
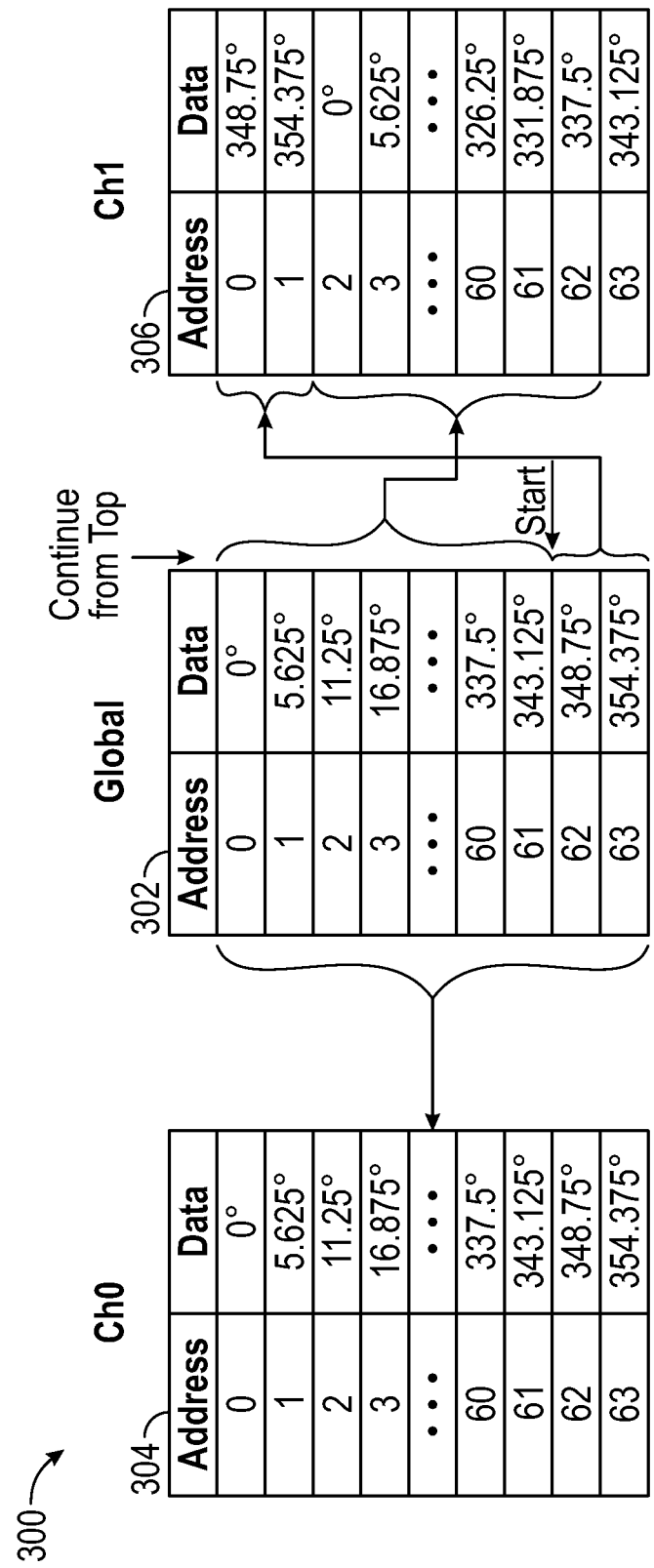
FIG. 3 illustrates an example of the use of a phase shifter configuration table for configuration of phase shifters for each of the channels of the beamforming chip according to certain aspects.

FIG. 3 illustrates an example 300 of the use of a phase shifter configuration table for configuration of phase shifters for each of the channels of the beamforming chip according to an aspect.

In some cases, the actual phase for each channel may vary when the beamformer is configured to transmit a signal at a particular phase. This variance in phase may, similarly to the variance in gain, be attributable to differences in channels due to the manufacturing process or non-uniformity in the materials (e.g., semiconductor dies). For instance, with reference to the tables in FIG. 3, when the phase is set to 0 degrees channel 0 may be at 0 degrees while channel 1 may be around 12 degrees. In some cases, the reference phase may be set to 0 degrees. However, the present disclosure is not limited as such, and other phase values may be used.

In some aspects, the reference phase can be subtracted from the measured phase of the channel. For channel 0 (ch0), the reference phase of 0 degrees can be subtracted from the measured phase of 0 degrees. Accordingly, the portion of the phase configuration table 302 stored in the global memory can be copied to the channel 0 (ch0) memory 304, starting from the address that corresponds to the 0 degrees.

In the illustrated implementation of FIG. 3, the granularity of phase adjustments may be 5.625 degrees in this particular non-limiting example. Thus, 64 entries can be copied into channel 0 table 304. The copied portion can start at the address corresponding to 0 degrees (address 0 in the global memory 302) and go up to 354.375 degrees (address 63 in the global memory 302). The copied portion into the channel 0 memory 304 can be copied such that the address corresponding to 0 degrees is the starting address (address 0) in the channel 0 memory 304, and the address corresponding to the 374.375 is the last address (address 63) in the channel 0 memory 304. Likewise, the channel 1 (ch1) memory 306 can be populated based the global memory 302. However, in the illustrated example, channel 1 may have a measured phase difference of 12 degrees compared to channel 0. In some implementations, the phase of channel 1 may be adjusted by 348 degrees such that channel 1 and channel 0 are both at 0 degrees. In the illustrated example, the phase of channel 1 may be adjusted by 348.75 degrees due to step-size granularity or resolution being in increments of 5.625 degrees. In some cases, a more fine granularity may be used. However, in such cases, the amount of memory required to store the calibration table is increased.

In some aspects, for channel 1 (ch1), the reference phase of 0 degrees can be subtracted from the measured phase of 12 degrees. Accordingly, another portion of the phase configuration table 302 stored in the global memory can be copied to the channel 1 (ch1) memory 306, starting from the address that corresponds to the 348.75 degrees, which was the difference between the reference phase of 0 degrees and the measured of 12 degrees for channel 1. The system can identify that 348.75 degrees is to the closest degree to 348 degrees, which corresponds to −12 degrees (the difference between 0 and 12 degrees).

In some aspects, because the resolution is 5.625 degrees, the copied portion can start at the address corresponding to 3478.75 degrees (address 62 in the global memory 202) and go up to the last entry in the global memory 302 (address 63), continue from the first address in the global memory 302 (address 0), and up to 343.125 degrees (address 61), totaling 63 addresses. The copied portion into the channel 1 memory 306 can be copied such that the address corresponding to the 348.75 degrees is the starting address (address 0) in the channel 1 memory 306, and the address corresponding to the 343.125 degrees is the last address (address 63) in the channel 1 memory 306.

Beamforming Chip Architecture with Phase Shifters and Variable Gain Amplifiers

Figure 4:
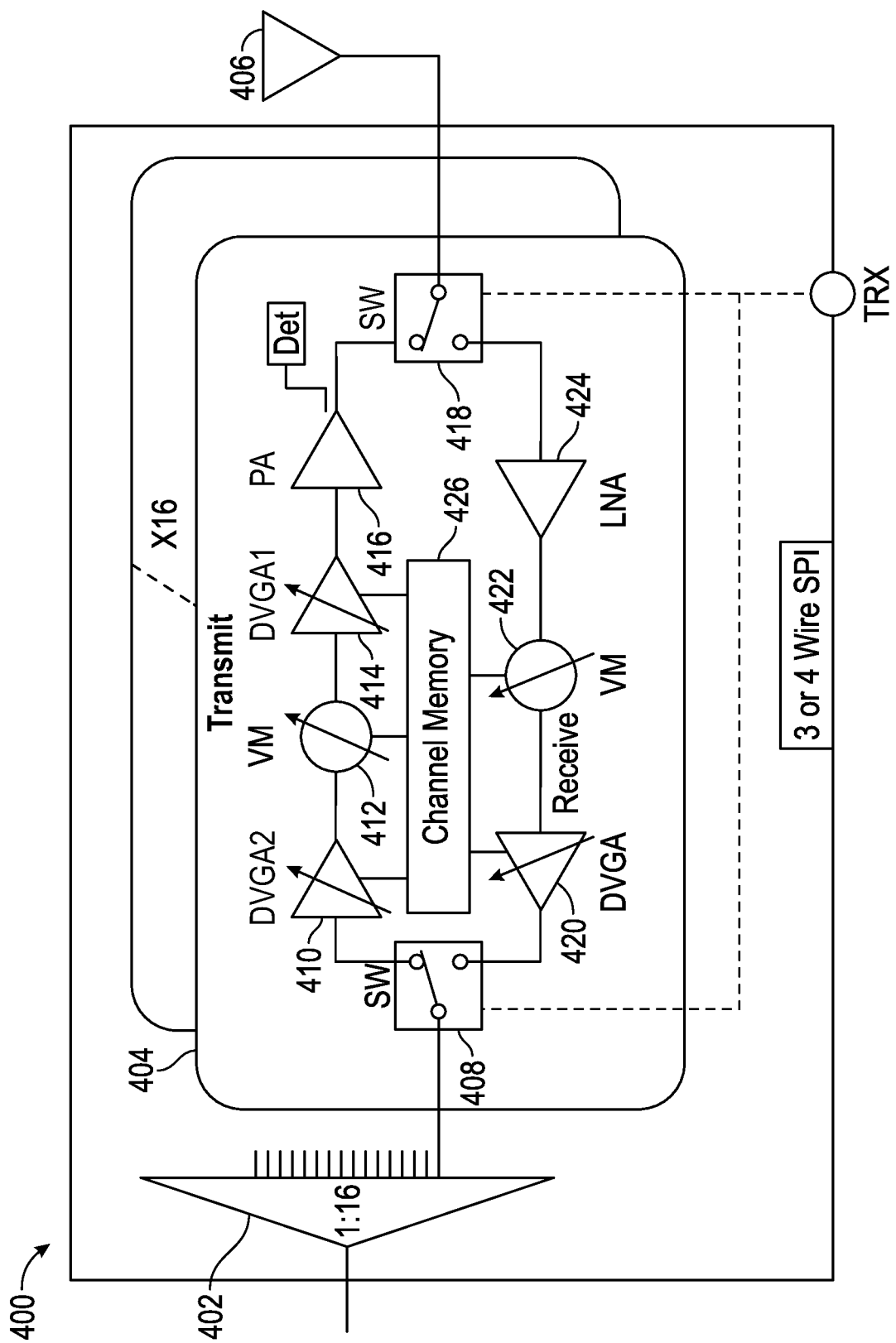
FIG. 4 illustrates an example beamforming chip architecture with phase shifters and variable gain amplifiers according to certain aspects.

FIG. 4 illustrates an example beamforming chip architecture 400 with phase shifters and variable gain amplifiers according to an aspect. The beamformer chip may include a number of channels. For example, the illustrated embodiments includes 16 channels. Each channel may have a similar architecture or similar components as the channel 404. The channel 404 of the beamforming chip 400 can include digital variable gain amplifiers 410, 414, 420, a power amplifier 416, phase shifters 412, 422, a low noise amplifier 424, switches 408, 418, a power divider 402, and a channel memory 426. The beamforming chip can set the phase of the signals by sending a phase calibration signal to the phase shifters 412, 422 from the phase configuration table corresponding to the channel. The beamforming chip can set the gain of the signals by sending a gain calibration signal to the variable gain amplifiers 410, 414, 420 from the gain configuration table corresponding to the channel. The channel memory 426 can include the gain configuration table and/or the phase configuration table corresponding to the channel. The power divider 402 can divide input power to 16 channels in the transmit mode and/or combine receiver channel power into 1 output channel in the receive mode. In some aspects, the beamforming chip architecture 400 can communicate with an antenna element 406.

In some aspects, there are 16 channels 404 that feed into a power divider 402 (or other component such as an adder or splitter) for digital signal processing. The signals from the digital signal processor can be sent to a switch 408, which can switch the route of the signals to be transmitted instead of being received by the transceiver. A signal on the transmit path may be processed by one or more digital variable gain amplifiers 410, 414, a phase shifter 412, and a power amplifier 416. Then, the signal can be provided to the switch 418 that connects the transmit path with the antenna element 406.

In some aspects, if the switch is switched to the receive path, the signal can be received by the antenna element 406, and the switch 418 can propagate the signal through the receive path. The receive path may include a low noise amplifier 424, a phase shifter 422, and a digital variable gain amplifier 420. The switch 408 may connect the receive path to the power divider 402 for further signal processing.

In some aspects, the controller for the antenna array can transmit a signal to a variable gain amplifier corresponding to the channel to adjust the gain of the channel based on the portion of the gain configuration table copied into the channel memory. The controller for the antenna array can transmit a signal to a phase shifter corresponding to the channel to adjust the phase of the channel based on the retrieved portion of the phase table.

Single Semiconductor Beamforming Chip Architecture

Figure 5:
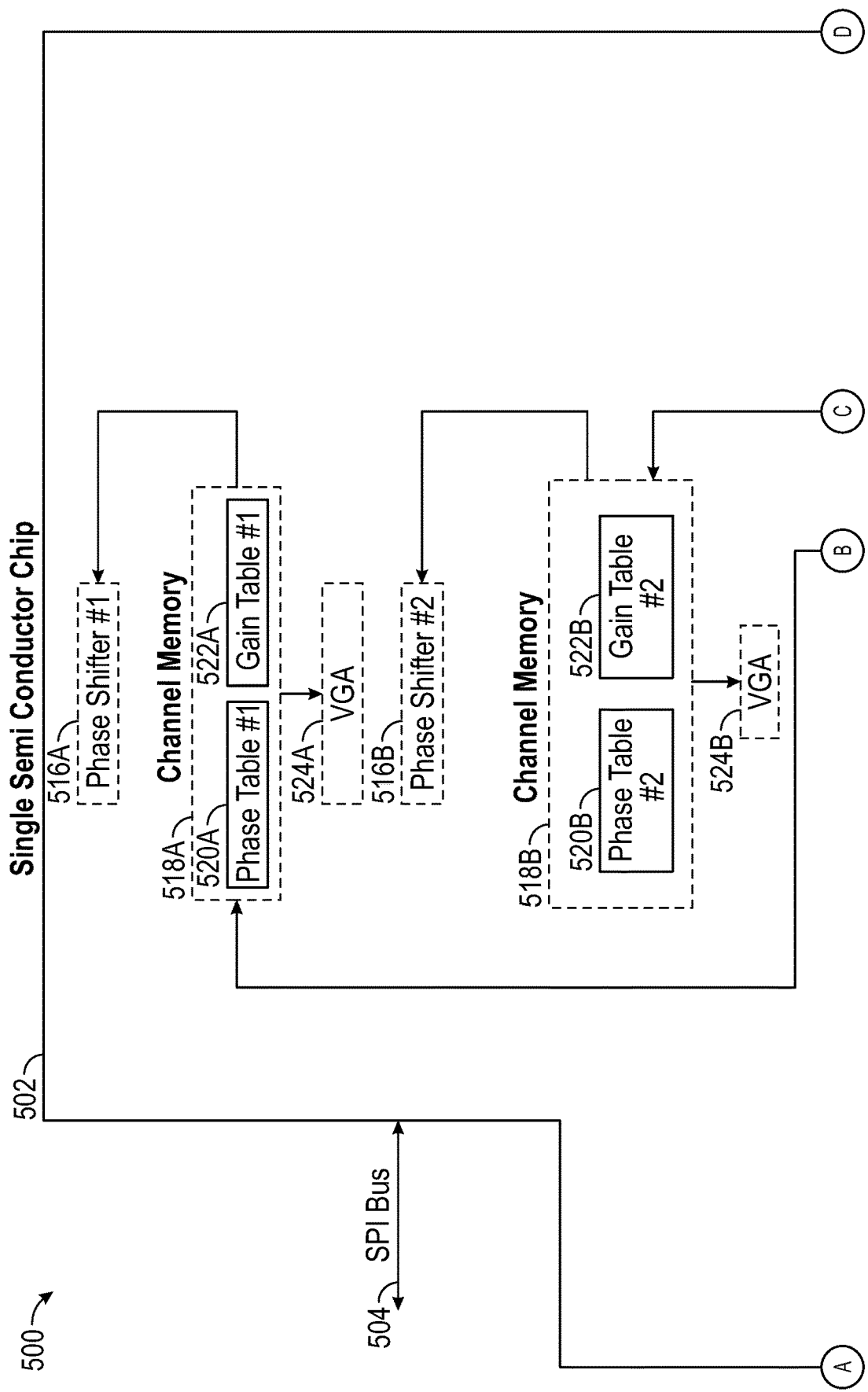
FIG. 5 illustrates an example beamforming chip architecture with channels on a single semiconductor chip according to certain aspects.
Figure 5:
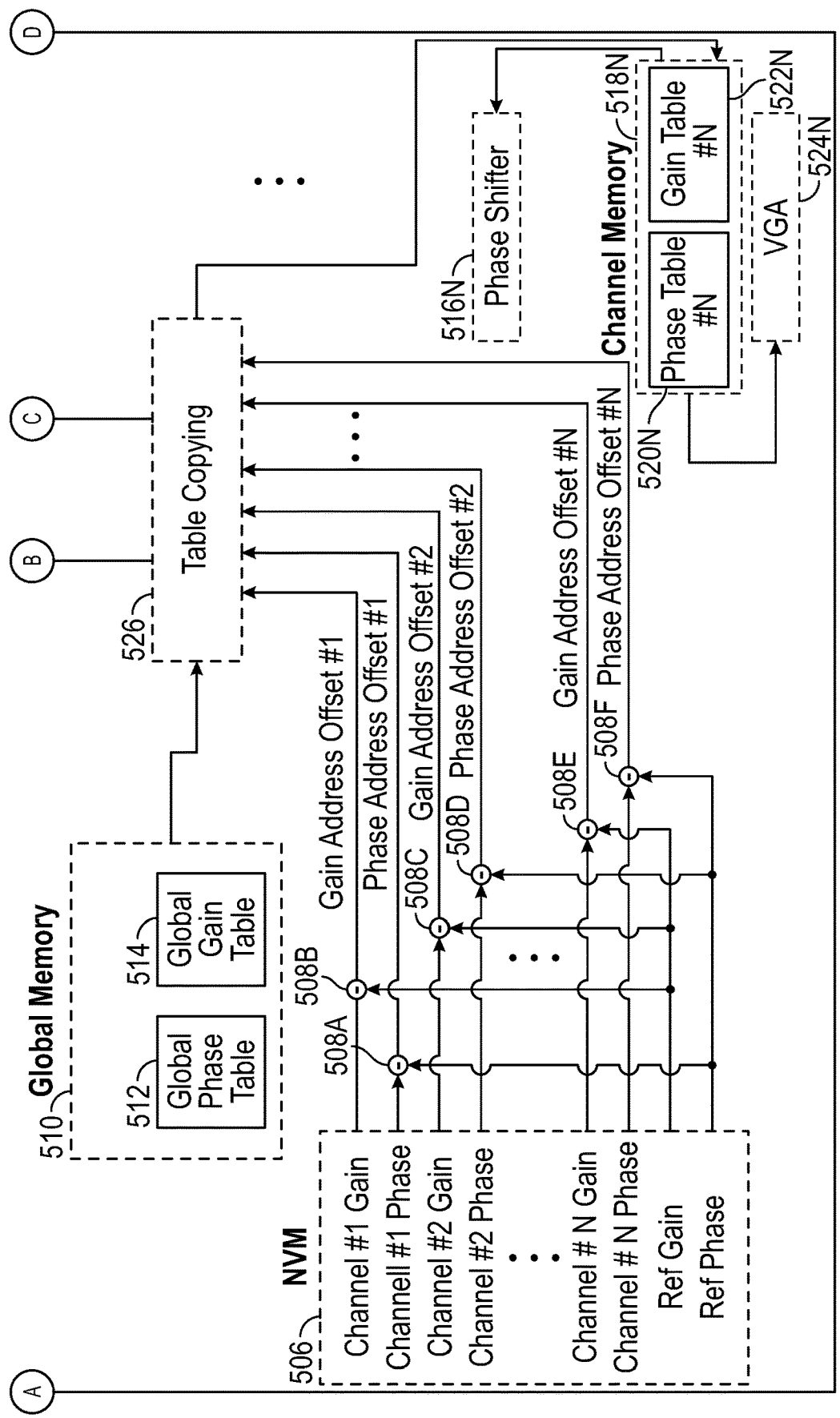

FIG. 5 illustrates an example beamforming chip architecture 500 with channels on a single semiconductor chip according to certain aspects. In some aspects, a user can program a desired gain and/or phase for each of the channels. The user can input the desired gain and/or phase to the single semiconductor chip 502 via an interface, such as a Serial Peripheral Interface (SPI) bus 504.

In some aspects, measurements of each channel's gain and phase are stored in Non-Volatile Memory (NVM) 506. In the example of FIG. 5, there are N total channels, where N may include any positive integer. For instance, there may be 1, 2, 4, 8, 16, 24, 32, 64 channels, any number of channels between the preceding examples, or more channels. The measured channel gain for each channel can be subtracted from a reference gain via a corresponding subtractor 508A, 508C, 508E to generate a gain address offset. The reference gain can be stored in the NVM 506. The measured channel phase for each channel can be subtracted from a reference phase via a corresponding subtractor 508B, 508D, 508F to generate a phase address offset. The reference phase can be stored in the NVM 506.

In some aspects, the gain address offset can be used to determine a start address for copying a portion of a variable gain amplifier configuration attenuation table (or the global gain table 514 stored in the global memory 510). The start address can correspond to an entry in the variable gain amplifier configuration attenuation table for a particular gain or a gain attenuation value based on a difference between a reference gain and a maximum gain for the channel. For example, if the difference between the reference gain and the measured gain for a particular channel is 0 (or about 0), the start address may correspond to the address indicating a gain attenuation value of 0 dB. A processor or controller may copy a portion of the variable gain amplifier configuration attenuation table starting at the start address and ending at an address that reflects the total gain range of the channel.

In some aspects, the phase address offset can be used to determine a start address for copying a portion of a phase shifter configuration table (or the global phase table 512 stored in the global memory 510). The start address can correspond to a difference in the reference phase and a measured phase for the channel. For example, if the reference phase is 0 (or about 0) and the measured phase is 0 (or about 0), then the start address can correspond to 0 degrees. Is some cases, the entire phase calibration table is copied because all phase values may be supported. However, the starting address of the phase calibration table may vary based on differences between the reference phase and the channel phase at the selected reference setting. The portion of the phase shifter configuration table that is copied can start at the start address and continue through 360 degrees. For example, if the reference phase is 0 degrees and the measured phase is 10 degrees, the start address can be 350 degrees. With a resolution of 5 degrees for the phase shifter configuration table, the copied portion of the phase shifter configuration table can include 350 and 355, and then wrap back around to 0 degrees. Thus, the copied portion of the phase shifter configuration table can start at 350, continue to 355, 0, 5, 10, 15 . . . and wrap around to 345.

In some aspects, the copied portions of the variable gain amplifier configuration attenuation table and the phase shifter configuration table can be stored in the corresponding channel memories. For example, the copied portions of the variable gain amplifier configuration attenuation table for channel 1 can be stored into the gain table #1 522A in the channel memory 518A for channel 1. The copied portions of the phase shifter configuration table for channel 1 can be stored into the phase table #1 520A in the channel memory 518A for channel 1. The copied portions of the variable gain amplifier configuration attenuation table for channel 2 can be stored into the gain table #2 522B in the channel memory 5188 for channel 2. The copied portions of the phase shifter configuration table for channel 2 can be stored into the phase table #2 520B in the channel memory 518B for channel 2. The copied portions of the variable gain amplifier configuration attenuation table for channel N can be stored into the gain table #N 522N in the channel memory 518N for channel N. The copied portions of the phase shifter configuration table for channel N can be stored into the phase table #N 520N in the channel memory 518N for channel N.

In some aspects, the copied portions of the variable gain amplifier configuration attenuation table can be used to determine the change in the variable gain amplifier 524A, 524B, 524N for the corresponding channels. The copied portions of the phase shifter configuration table can be used to determine the change in the phase shifter 516A, 5168, 516N for the corresponding channels.

Additional Aspects

Any of the principles and advantages discussed herein can be applied to other systems, not just to the systems described above. Some aspects can include a subset of features and/or advantages set forth herein. The elements and operations of the various aspects described above can be combined to provide further aspects. The acts of the methods discussed herein can be performed in any order as appropriate. Moreover, the acts of the methods discussed herein can be performed serially or in parallel, as appropriate. While circuits are illustrated in particular arrangements, other equivalent arrangements are possible.

Any of the principles and advantages discussed herein can be implemented in connection with any other systems, apparatus, or methods that benefit could from any of the teachings herein. For instance, any of the principles and advantages discussed herein can be implemented in connection with any devices with a need to adjust the amplitude or phase of a phased array.

Aspects of this disclosure can be implemented in various electronic devices. For instance, one or more of the above phased array aspects can be implemented in accordance with any of the principles and advantages discussed herein can be included in various electronic devices. Examples of the electronic devices can include, but are not limited to, cell phone base stations, radar systems, radar detectors, consumer electronic products, parts of the consumer electronic products such as semiconductor die and/or packaged modules, electronic test equipment, etc. Examples of the electronic devices can also include communication networks. The consumer electronic products can include, but are not limited to, a phone such as a smart phone, a laptop computer, a tablet computer, a wearable computing device such as a smart watch or an ear piece, an automobile, a camcorder, a camera, a digital camera, a portable memory chip, a washer, a dryer, a washer/dryer, a copier, a facsimile machine, a scanner, a multifunctional peripheral device, a wireless access point, a router, etc. Further, the electronic device can include unfinished products, including those for industrial and/or medical applications.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected, or connected by way of one or more intermediate elements. Thus, although the various schematics shown in the figures depict example arrangements of elements and components, additional intervening elements, devices, features, or components may be present in an actual aspect (assuming that the functionality of the depicted circuits is not adversely affected). Additionally, the words "herein," "above," "below," and words of similar import, when used in this application, shall refer to this application as a whole and not to any particular portions of this application. Where the context permits, words in the Detailed Description of Certain Aspects using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values or distances provided herein are intended to include similar values within a measurement error.

While certain aspects have been described, these aspects have been presented by way of example only, and are not intended to limit the scope of the disclosure. Indeed, the novel apparatus, systems, and methods described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A controller configured to calibrate a beamforming integrated circuit, the controller comprising: a non-volatile memory configured to store measured gain data fora plurality of channels of a beamforming integrated circuit; and calibration circuitry configured to: determine a reference gain value based at least in part on the measured gain data for the plurality of channels stored at the non-volatile memory; and for each channel of the plurality of channels: determine a difference between a maximum gain value of the channel obtained from the non-volatile memory and the reference gain value; and copy a portion of a variable gain amplifier configuration attenuation table stored in a shared memory of the beamforming integrated circuit to a channel memory associated with the channel, wherein the variable gain amplifier configuration attenuation table comprises configuration settings for variable gain amplifiers of the beamforming integrated circuit, and wherein the portion of the variable gain amplifier configuration attenuation table copied from the shared memory starts at an address corresponding to the difference between the maximum gain value of the channel and the reference gain value.

2. The controller of claim 1, wherein at least one channel supports a different maximum gain value than at least one other channel of the plurality of channels.

3. The controller of claim 1, wherein each channel of the plurality of channels supports a maximum gain value.

4. The controller of claim 3, wherein at least one channel of the plurality of channels supports a different maximum gain value.

5. The controller of claim 1, wherein the reference gain value comprises a lowest common value among a set of maximum gain values supported by the plurality of channels, wherein the set of maximum gain values comprises maximum gain values supported by at least one of the plurality of channels.

6. The controller of claim 1, wherein the non-volatile memory is further configured to store measured phase data for the plurality of channels, wherein the calibration circuitry is further configured to: determine a reference phase value based at least in part on the measured phase data for the plurality of channels stored at the non-volatile memory; and for each channel of the plurality of channels: determine a difference between a phase value of the channel obtained from the non-volatile memory and the reference phase value; and copy a portion of a phase shifter configuration table stored in the shared memory of the beamforming integrated circuit to the channel memory associated with the channel, wherein the phase shifter configuration table comprises configuration settings for phase shifters of the beamforming integrated circuit, and wherein the portion of the phase shifter configuration table copied from the shared memory starts at an address corresponding to the difference between the phase value of the channel and the reference phase value.

7. The controller of claim 1, wherein the reference gain value is stored in volatile memory.

8. The controller of claim 1, wherein the shared memory is a volatile memory.

9. The controller of claim 1, wherein the channel memory corresponding to each of the plurality of channels is a volatile memory.

10. A method for calibrating a beamforming integrated circuit, the method comprising: storing, in a non-volatile memory, measured gain data for a plurality of channels of a beamforming integrated circuit; and determining, by calibration circuitry, a reference gain value based at least in part on the measured gain data for the plurality of channels stored at the non-volatile memory; and for each channel of the plurality of channels: determining a difference between a maximum gain value of the channel obtained from the non-volatile memory and the reference gain value; and copying a portion of a variable gain amplifier configuration attenuation table stored in a shared memory of the beamforming integrated circuit to a channel memory associated with the channel, wherein the variable gain amplifier configuration attenuation table comprises configuration settings for variable gain amplifiers of the beamforming integrated circuit, and wherein the portion of the variable gain amplifier configuration attenuation table copied from the shared memory starts at an address corresponding to the difference between the maximum gain value of the channel and the reference gain value.

11. The method of claim 10, wherein at least one channel supports a different maximum gain value than at least one other channel of the plurality of channels.

12. The method of claim 10, wherein each channel of the plurality of channels supports a maximum gain value.

13. The method of claim 12, wherein at least one channel of the plurality of channels supports a different maximum gain value.

14. The method of claim 10, wherein the reference gain value comprises a lowest common value among a set of maximum gain values supported by the plurality of channels, wherein the set of maximum gain values comprises maximum gain values supported by at least one of the plurality of channels.

15. The method of claim 10, wherein the method further comprises: storing, in the non-volatile memory, measured phase data for the plurality of channels; determining a reference phase value based at least in part on the measured phase data for the plurality of channels stored at the non-volatile memory; and for each channel of the plurality of channels: determining a difference between a phase value of the channel obtained from the non-volatile memory and the reference phase value; and copying a portion of a phase shifter configuration table stored in the shared memory of the beamforming integrated circuit to the channel memory associated with the channel, wherein the phase shifter configuration table comprises configuration settings for phase shifters of the beamforming integrated circuit, and wherein the portion of the phase shifter configuration table copied from the shared memory starts at an address corresponding to the difference between the phase value of the channel and the reference phase value.

16. The method of claim 10, wherein the reference gain value is stored in volatile memory.

17. The method of claim 10, wherein the shared memory is a volatile memory.

18. The method of claim 10, wherein the channel memory corresponding to each of the plurality of channels is a volatile memory.

19. A controller configured to calibrate a beamforming integrated circuit, the controller comprising: calibration circuitry configured to: determine a reference gain value based at least in part on measured gain data for the plurality of channels stored at a non-volatile memory; and for each channel of the plurality of channels: copy a portion of a variable gain amplifier configuration attenuation table stored in a shared memory of the beamforming integrated circuit to a channel memory associated with the channel, wherein the variable gain amplifier configuration attenuation table comprises configuration settings for variable gain amplifiers of the beamforming integrated circuit, and wherein the portion of the variable gain amplifier configuration attenuation table copied from the shared memory starts at an address corresponding to a difference between a maximum gain value of the channel obtained from the non-volatile memory and the reference gain value.

20. The controller of claim 19, wherein the reference gain value is stored in volatile memory.

* * * * *